United States Patent

Marupaduga et al.

(10) Patent No.: US 9,301,159 B1
(45) Date of Patent: Mar. 29, 2016

(54) ADAPTIVE CONVOLUTION METHOD IN LONG TERM EVOLUTION NETWORKS

(71) Applicant: Sprint Communications Company L.P., Overland Park, KS (US)

(72) Inventors: Sreekar Marupaduga, Overland Park, KS (US); Rajveen Narendran, Olathe, KS (US); Nicholas David Caola Kullman, Kansas City, MO (US); Andrew Mark Wurtenberger, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 286 days.

(21) Appl. No.: 13/796,919

(22) Filed: Mar. 12, 2013

(51) Int. Cl.
   *H04B 15/00* (2006.01)
   *H04W 24/02* (2009.01)
(52) U.S. Cl.
   CPC .................................. *H04W 24/02* (2013.01)
(58) Field of Classification Search
   None
   See application file for complete search history.

(56) References Cited

U.S. PATENT DOCUMENTS

| | | | | |
|---|---|---|---|---|
| 8,115,605 B2* | 2/2012 | Macaluso | ................ | H04B 3/54 340/12.32 |
| 2007/0086550 A1* | 4/2007 | Kaise | ................... | H04B 1/1027 375/348 |
| 2007/0230324 A1* | 10/2007 | Li | ......................... | H04L 1/0026 370/204 |
| 2008/0084938 A1* | 4/2008 | Li | ....................... | H04L 25/0228 375/260 |
| 2009/0110087 A1* | 4/2009 | Liu | ....................... | H04L 1/0021 375/260 |
| 2009/0111385 A1* | 4/2009 | Choi | ................... | H04L 27/2607 455/67.13 |
| 2010/0223524 A1* | 9/2010 | Duggan | ................... | H04L 1/20 714/751 |
| 2011/0044188 A1* | 2/2011 | Luo | ..................... | H04L 27/2607 370/252 |
| 2012/0184322 A1* | 7/2012 | Falconetti | ............. | H04W 28/18 455/524 |
| 2012/0281551 A1* | 11/2012 | Alanara | .............. | H04L 27/2607 370/252 |
| 2013/0022090 A1* | 1/2013 | Weng | ................ | H04L 25/03343 375/219 |

* cited by examiner

*Primary Examiner* — Edward Urban
*Assistant Examiner* — Ralph H Justus (57) ABSTRACT

A method, system, and medium are provided for dynamically enabling and disabling cyclic prefix within a long-term evolution (LTE) channel. A base station receives channel quality indication (CQI) reports indicating levels of ISI within the LTE channel. The base station determines whether the levels of ISI within the LTE channel are greater than, equal to, or less than a predetermined threshold level of ISI for the LTE channel. Based on the determination, the base station either enables or disables cyclic prefix within the LTE channel. In addition to levels of ISI, numbers of roaming users or cell edge users utilizing the LTE channel may affect whether cyclic prefix is enabled or disabled within the LTE channel.

20 Claims, 4 Drawing Sheets

ADAPTIVE CONVOLUTION METHOD IN LONG TERM EVOLUTION NETWORKS

SUMMARY

This Summary is provided to introduce a selection of concepts in a simplified form that are further described below in the Detailed Description. Embodiments of the present invention are defined by the claims below. This Summary is not intended to identify key features or essential features of the claimed subject matter, nor is it intended to be used as an aid in isolation to determine the scope of the claimed subject matter.

In brief and at a high level, this disclosure describes, among other things, the dynamic enablement and disablement of cyclic prefix in a long-term evolution (LTE) channel so as to eliminate intersymbol interference (ISI) and distortion levels within the LTE channel. At a base station, an indication of levels of ISI within a channel is received, and the base station utilizes such information to determine whether to dynamically enable or disable a downlink direction cyclic prefix within the channel.

When inputs are received indicating that ISI is above a predetermined threshold level, cyclic prefix is enabled. If the level of ISI is less than or decreases below the predetermined threshold level, however, cyclic prefix is dynamically disabled, resulting in more available bandwidth for users. In embodiments, other conditions, such as, for example, the number of cell edge or roaming users or the distortion levels affecting groups of users, may influence the determination to turn on or off cyclic prefix.

BRIEF DESCRIPTION OF SEVERAL VIEWS OF THE DRAWINGS

Illustrative embodiments of the present invention are described in detail below with reference to the attached drawing figures, and wherein.

DETAILED DESCRIPTION

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

CDMA Code Division Multiple Access
    CQI Channel Quality Indication
    eNodeB Evolved NodeB
    EvDO Enhanced Voice-Data Only
    GPRS General Packet Radio Service
    GSM Global System for Mobile Communications
    HSDPA High-Speed Downlink Packet Access
    ISI Intersymbol Interference
    LTE Long Term Evolution
    OFDM Orthogonal Frequency-Division Multiplexing
    RF Radiofrequency
    TDMA Time Division Multiple Access
    UE User Equipment
    UMTS Universal Mobile Telecommunications System
    WCDMA Wideband Code Division Multiple Access Further, various technical terms are used throughout this description. An illustrative resource that fleshes out various aspects of these terms can be found in Newton's Telecom Dictionary, 25th Edition (2009).

Embodiments of our technology may be embodied as, among other things, a method, system, or set of instructions embodied on one or more computer-readable media. Computer-readable media include both volatile and nonvolatile media, removable and non-removable media, and contemplate media readable by a database, a switch, and various other network devices. Computer-readable media include media implemented in any way for storing information. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Examples of the present invention are directed toward methods, systems and computer-readable storage media for use in dynamically turning on or off cyclic prefix in a downlink LTE channel in order to eliminate or reduce ISI within the LTE channel. Initially, a threshold level of ISI for the channel is predetermined by, for example, the network (i.e., based on signal quality measurement reports) or a service provider. The threshold level indicates an amount of ISI above which cyclic prefix should be turned on, and an amount of ISI below which cyclic prefix should be turned off.

When inputs are received indicating that ISI is above a predetermined threshold level, cyclic prefix is enabled. If the level of ISI is less than or decreases below the predetermined threshold level, however, cyclic prefix is dynamically disabled, resulting in more available bandwidth for users. In embodiments, other conditions, such as, for example, the number of cell edge or roaming users or the distortion levels affecting groups of users, may influence the determination to turn on or off cyclic prefix.

In one aspect, a base station receives input from mobile communication devices (i.e., signal quality measurement reports) indicating levels of ISI within a channel. Based on the input, the base station may determine that the level of ISI within a channel is above a predetermined threshold level of ISI for the channel and dynamically enable cyclic prefix within the channel.

In a second aspect, the base station receives input from mobile communication devices indicating levels of ISI within a channel. Based on the input, the base station may determine that the level of ISI within the channel is below a predetermined threshold level of ISI for the channel and dynamically disable cyclic prefix within the channel.

In a third aspect, the base station receives input from mobile communication devices indicating a number of cell edge users or roaming users utilizing a wireless channel. Based on the input, the base station may determine that the number of cell edge users or roaming users utilizing the channel is above a threshold number. The threshold number may be predetermined by a service provider or the network, based on, for example, a need to maintain minimally-acceptable data and voice transmission speeds for such users. In particular, the threshold number may be a number at or above which a particular channel cannot support a given user (e.g., roaming users). Upon making the determination, the base station is configured to dynamically disable cyclic prefix within the channel. Disabling cyclic prefix should increase user throughputs by providing increased bandwidth to cell edge and/or roaming users.

As way of background, cyclic prefix is a well-designed and simplified way to mitigate ISI among OFDM symbols and remove distortion in wireless channels. In particular, cyclic prefix refers to the prefixing of a symbol with a repetition at the end. When cyclic prefix is enabled within a channel, circular convolution is introduced. When cyclic prefix is disabled within a channel, linear convolution is introduced. Linear convolution is inherently provided in LTE channels.

Figure 3:
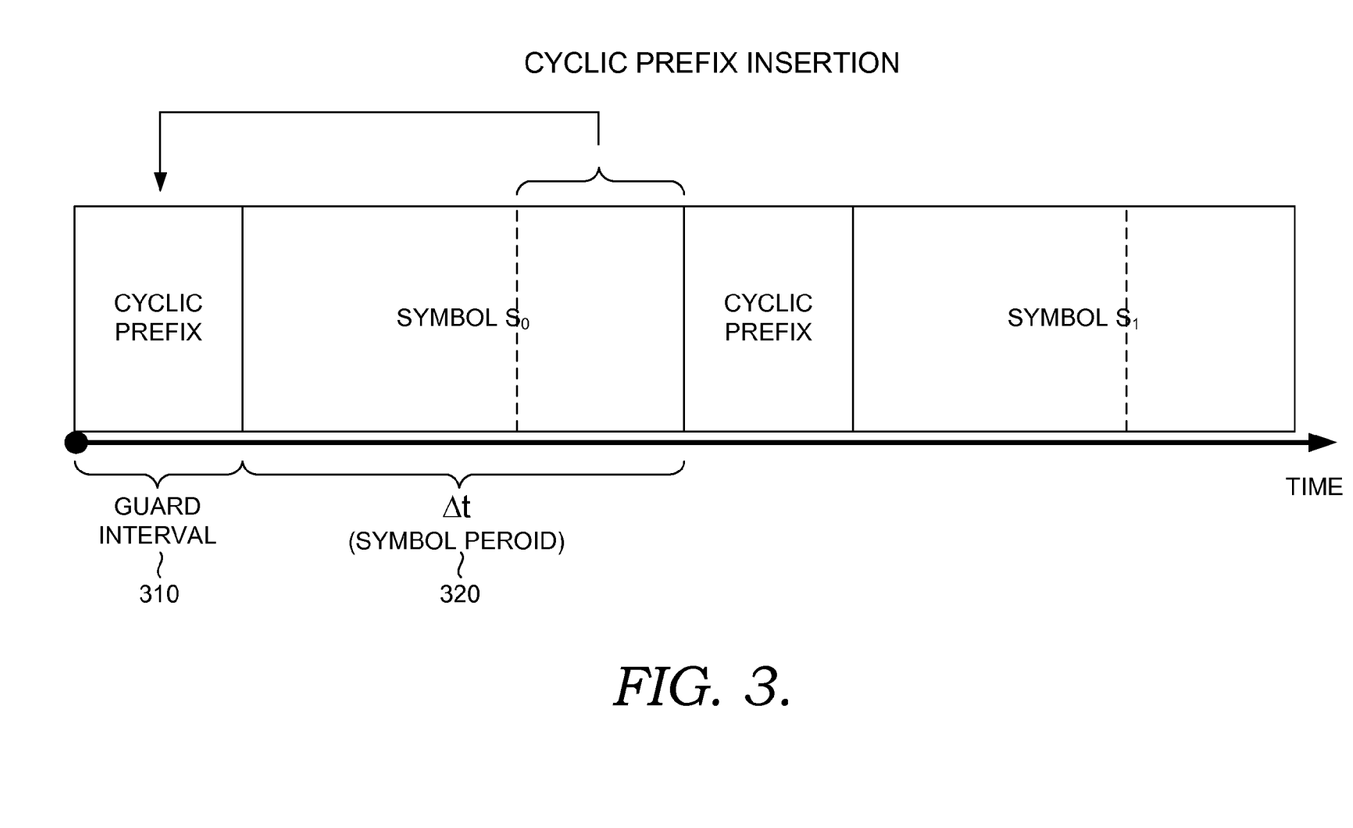
FIG. 3 depicts a diagram of an exemplary cyclic prefix in accordance with embodiments of the present invention.

Turning to FIG. 3, an exemplary diagram of a cyclic prefix insertion is depicted. As shown, the cyclic prefix includes the end of the symbol 320 prefixed to the beginning of the symbol 320. The cyclic prefix acts as a guard interval 310, reducing the effect of the delay in the amount of time it takes for a symbol to reach a receiver, the delay increasing as multipath propagation increases. By increasing the time in which a symbol is allowed to reach a receiver (i.e., inserting the cyclic prefix at the beginning of the symbol), intersymbol interference is decreased.

A cyclic prefix may be generally described as one of a normal cyclic prefix with 6 OFDM symbols and a length of 4.7 µs or an extended cyclic prefix with 7 OFDM symbols and a length of 16.6 µs. Generally, a longer cyclic prefix (i.e., the extended cyclic prefix) is implemented in circumstances when multipath propagation is abundant. While normal cyclic prefix, and to a greater extent, extended cyclic prefix, protect against ISI, enablement of either type of cyclic prefix decreases user throughputs and comes with a power penalty. For example, when normal cyclic prefix is enabled, data rate transfer may be 8 Megabits/second, whereas when normal cyclic prefix is turned off, data rate transfer may be 9 or 10 Megabits/second.

Traditional solutions to reducing ISI within a channel include static enablement of cyclic prefix (i.e., cyclic prefix remains turned on until manually turned off by an operator). Static implementation of cyclic prefix is neither convenient nor efficient and is not easily adaptable to changing circumstances within wireless channels. Thus, improvements are still needed.

Figure 1:
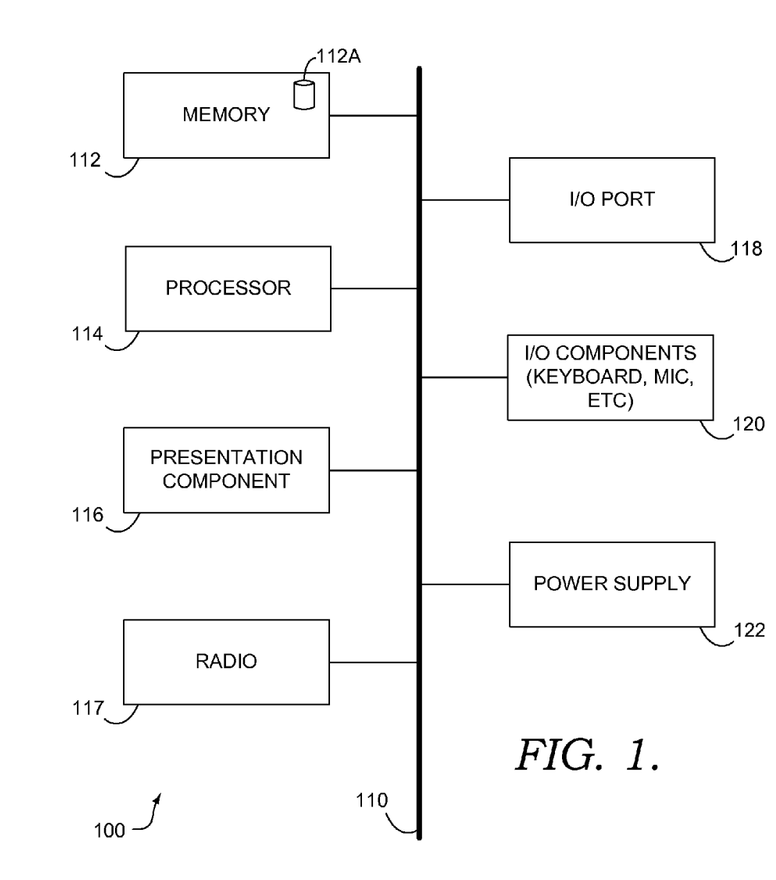
FIG. 1 depicts a block diagram of a mobile device in accordance with an embodiment of the present invention.

Turning now to FIG. 1, a block diagram of an illustrative mobile device is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. Processor 114 might actually be multiple processors that receive instructions and process them accordingly. Presentation component 116 includes the likes of a display and a speaker, as well as other components that can present information (such as a lamp (LED), or even lighted keyboards).

Radio 117 represents a radio that facilitates communication with a wireless telecommunications network. Illustrative wireless telecommunications technologies include CDMA, 1×A, GPRS, TDMA, GSM, WiMax technology, LTE, LTE Advanced and the like. In some embodiments, radio 117 might also facilitate other types of wireless communications including Wi-Fi communications and GIS communications, and other near-field communications.

Input/output port 118 might take on a variety of forms. Illustrative input/output ports include a USB jack, stereo jack, infrared port, proprietary communications ports, and the like. Input/output components 120 include items such as keyboards, microphones, touchscreens, and any other item usable to directly or indirectly input data into mobile device 100. Power supply 122 includes items such as batteries, fuel cells, or any other component that can act as a power source to power mobile device 100.

Figure 2:
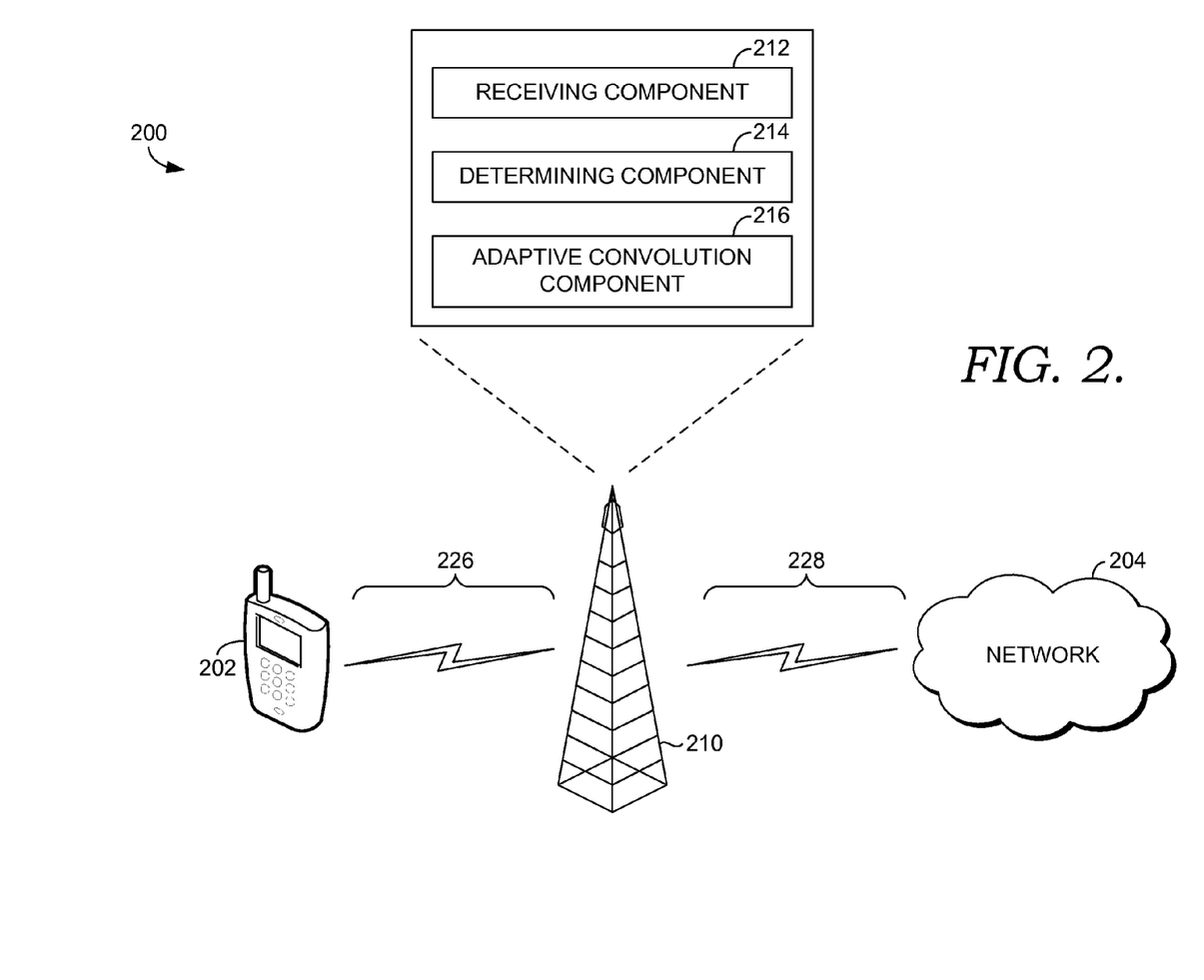
FIG. 2 depicts an illustrative networking environment suitable to implement embodiments of the present invention.

FIG. 2 provides an exemplary network environment suitable for use in implementing embodiments of the present invention and is referenced generally by the numeral 200. The network 200 includes a mobile device 202, a base station 210, and a core network 204. The network 200 is but one example of a suitable network environment and is not intended to suggest any limitation as to the scope of use or functionality of the invention. Neither should the network environment be interpreted as having any dependency or requirement relating to any one or combination of components illustrated.

Mobile device 202, in one embodiment, is the type of device described herein in connection with FIG. 1. The mobile device 202 may support multiple technologies such as CDMA 1×A, GPRS, EvDO, TDMA, GSM, WiMax technology, LTE, LTE Advanced, and the like. Alternatively, the mobile device 202 may support one type of technology, such as LTE (LTE and/or LTE Advanced). Any and all such aspects, and any combination thereof, are contemplated as being within the scope of the invention. The mobile device 202 may subscribe to services offered by the core network 204. As such, the mobile device 202 may be in communication with the base station 210 via wireless-telecommunications links such as, for example, wireless-telecommunications link 226. The mobile device 202 may communicate with the base station 210 via the wireless-telecommunications link 226 to facilitate attachment of the mobile device 202 to the base station 210. Once attached, the mobile device 202 may also use the wireless-telecommunications link 226 to send and/or receive voice call information and/or data information as well as information concerning device capabilities. In one aspect, the mobile device 202 may utilize the wireless-telecommunications link 226 to send CQI reports that indicate a level of ISI within the network to the base station 210.

The base station 210 includes hardware and bandwidth(s) of a specified frequency. Although the term "base station" is used throughout this application, equivalent terms may include radio access node, eNodeB, and Node B. For example, if the wireless communications system utilizes LTE, the base station 210 would be termed eNodeB. The hardware includes, for example, the actual radio mast or tower, as well as antennas, transceivers, GPS receivers, electrical power sources, digital signal processors, control electronics, and the like that are associated with the radio tower. The RF spectrum bandwidth may comprise one or more channels. With respect to the disclosure provided herein, the term "channel" refers to a signal transmission medium that may include an upload spectrum and a download spectrum.

Besides being in communication with the mobile device 202 via the wireless-telecommunications link 226, the base station 210 may be in communication with other base stations (not shown) in the network via additional telecommunications links (not shown), which may be wired or wireless to facilitate handoffs or handovers between the different base stations when the mobile station 202 moves from one base station to the next. The base station 210 may also communicate with the core network 214 via wired and/or wireless telecommunications links such as, for example, telecommunications link 228.

The mobile device 202 can utilize network 204 to communicate with other computing devices (e.g., a mobile device(s), a server(s), a personal computer(s), etc.). In embodiments, the network 204 is a telecommunications network(s), or a portion thereof. A telecommunications network might include an array of devices or components, some of which are not shown so as to not obscure more relevant aspects of the invention. Components such as terminals, links, and nodes (as well as other components) can provide connectivity in some embodiments. Network 204 can include multiple networks, as well as being a network of networks, but is shown in more simple form so as to not obscure other aspects of the present invention. The network 204 can be part of a telecommunication network that connects subscribers to their immediate service provider. In embodiments, the network 204 can be associated with a telecommunications provider that provides services to user devices, such as mobile device 202. For example, the network 204 may provide voice services to user devices or corresponding users that are registered or subscribed to utilize the services (e.g., the network 204) provided by a telecommunications provider. The network 204 can be any communication network providing voice and/or data service(s), such as, for example, a 1× circuit voice, a 3G network (e.g., CDMA, CDMA2000, WCDMA, GSM, UMTS), or a 4G network (WiMAX, LTE, HSDPA).

As shown in FIG. 2, the base station 210 also includes illustrative components for carrying out embodiments of the present invention. The base station 210 comprises a receiving component 212, a determining component 214, and an adaptive convolution component 216. While particular components may be used, embodiments of the present invention are not limited to such components, and such components are shown for exemplary purposes only.

The receiving component 212 is configured to receive information about levels of ISI within a channel. In one embodiment, information associated with levels of ISI is received from CQI reports or other signal quality measurement reports. CQI reports are generated by individual mobile communication devices. CQIs may indicate the number of users operating within a cell or network, the location of the users, the number and identity of users at the cell edge and/or the number and identity of roaming users operating within a cell, and the like. Information contained within CQI reports may be dynamically (i.e., automatically and in real-time) updated. The receiving component 212 is also configured to receive information indicating a number of cell edge users or roaming users communicating with a base station via a wireless channel. Such information may also be distilled from signal quality measurement reports (e.g., CQI reports).

The receiving component 212 is configured to receive a predetermined threshold level of ISI for a channel from, for example, the network 204. The predetermined threshold level of ISI may generally be defined as the level at or above which cyclic prefix should be enabled and the level below which cyclic prefix should be disabled within a channel. The receiving component 212 is also configured to receive an indication of a threshold number of cell edge users and/or roaming users that may communicate via the wireless channel before cyclic prefix is disabled within the channel. The predetermined number of cell edge users and/or roaming users may also be received from the network 204. The predetermined threshold number of cell edge and/or roaming users may generally be defined as a number of cell edge and/or roaming users at or above which user throughputs decrease to below minimally-acceptable standards.

The predetermined threshold level of ISI and the predetermined threshold numbers of cell edge and/or roaming users are configurable by the network 204. The predetermined threshold level of ISI is based upon levels of distortion within a channel and/or signal quality associated with the channel. The predetermined threshold numbers of cell edge users and/or roaming users may be based upon a ratio of cell edge users to non-cell edge users and/or roaming users to non-roaming users. For example, the predetermined threshold number of cell-edge users may be a number at which cell edge users outnumber non-cell edge users communicating via a given channel. As well, the predetermined threshold number may take into account combined numbers of cell edge users and roaming users communicating via a given LTE channel. The predetermined threshold numbers may also be based on characteristics of the base station 210. For example, the processing load of the base station 210 or the number of LTE channels carried by the base station 210 may affect the predetermined threshold numbers. As well, predetermined threshold numbers of cell edge users or roaming users may be the same or different for each downlink LTE channel carried by the base station 210. While described herein as a single levels and single numbers, it will be understood that the threshold levels and numbers may include a range of levels or numbers. Many additional factors may contribute to a determination of a threshold level of ISI or threshold numbers of cell edge or roaming users, and the examples provided herein are not meant to be limiting.

The determining component 214 is configured to determine that the levels of ISI within the channel are above, the same as, or below the predetermined threshold level of ISI. When the levels of ISI within the channel are at or above the threshold level of ISI, the determining component 214 determines that cyclic prefix should be enabled (i.e., turned on), and the adaptive convolution component 216 dynamically turns cyclic prefix on. When the levels of ISI within the channel are below the threshold level of ISI, the determining component 214 determines that cyclic prefix should be disabled (i.e., turned off), and the adaptive convolution component 216 automatically turns cyclic off. In this way, the dynamic turning on and off of cyclic prefix mitigates power penalties associated with static enablement of cyclic prefix.

The determining component 214 is also configured to determine that, when the number of cell edge users or roaming users communicating via a wireless channel exceeds the predetermined threshold number of cell edge users and/or roaming users for the channel, cyclic prefix should be disabled. Upon making such a determination, the adaptive convolution component 216 dynamically disables cyclic prefix within the channel. In some embodiments, when the number of cell edge users or roaming users exceeds the predetermined threshold numbers of cell edge users and/or roaming users, cyclic prefix is disabled only if ISI within the channel also does not exceed the predetermined threshold level of ISI for the channel. In such embodiments, if ISI does exceed the predetermined threshold level of ISI, cyclic prefix will remain enabled, even though the number of cell edge or roaming users utilizing the channel exceeds the predetermined number of cell edge or roaming users for the channel.

The determining component 214 is also configured to determine signal quality and distortion levels associated with different LTE channels, as well as identities of users communicating via different LTE channels. Such information may be gleaned from one or more signal quality measurement reports, for example. In this way, the determining component 214 may determine that some LTE channels are experiencing higher ISI levels (i.e., distortion levels) than other LTE channels. The determining component 214 may also determine that some LTE channels are transmitting signals to higher numbers of cell edge users than other LTE channels carried by a same base station 210. In this same vein, the determining component 214 may determine that a first set of users are experiencing decreased user throughputs (i.e., data and/or voice transmission speed rates) than a second set of users, and that the first set of users are communicating via a different wireless channel than the second set of users. Additionally, the determining component 214 is configured to determine that the first set of users are in a different geographic location than the second set of users based on information contained within the signal quality measurement reports.

As an example used for illustrative purposes only, the determining component 214 is configured to determine that a first channel is experiencing levels of ISI that are higher than the predetermined threshold level of ISI. The determining component 214 is also configured to determine that at least a second channel is experiencing levels of ISI that are below the predetermined threshold level of ISI. Based on such determinations, the determining component 214 is configured to determine that cyclic prefix should be enabled within the first channel and disabled within at least the second channel. The adaptive convolution component 216 would then, in real-time, enable cyclic prefix in the first channel and disable cyclic prefix within at least the second channel. Similarly, the determining component 214 is configured to determine that at least a first channel is experiencing levels of ISI above the predetermined threshold level, while at least a second channel is carrying above the predetermined threshold number of cell edge users. The determining component 214 may determine, therefore, that cyclic prefix should be enabled within the first channel and disabled within at least the second channel. As with the first example, the adaptive convolution component 216 would then, in real-time, enable cyclic prefix in at least the first channel and disable cyclic prefix within at least the second channel.

Figure 4:
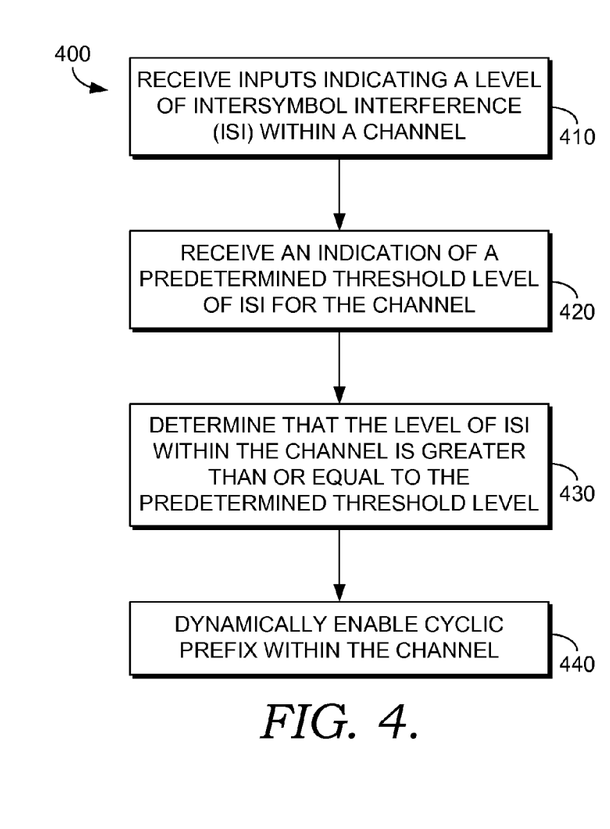
FIG. 4 depicts a flow diagram illustrating a method for dynamically enabling cyclic prefix within a wireless channel based on levels of ISI within the wireless channel according to embodiments of the present invention.

Turning now to FIG. 4 depicts a flow diagram illustrating a method for dynamically enabling cyclic prefix based on distortion levels within a network. At a step 410, one or more inputs indicating a level of ISI within a channel are received at a base station, such as the base station 210 of FIG. 2. These inputs may be received from a CQI report generated by each mobile communication device communicating via the channel. At a step 420, an indication of a predetermined threshold level of ISI for the channel is also received. The threshold level may be predetermined by a service provider, as described above.

At a step 430, it is determined that ISI within the channel is at a level greater than or equal to the threshold level of ISI. At a step 540, upon determining that ISI within the channel is greater than or equal to the threshold level of ISI, cyclic prefix is dynamically enabled (i.e., turned on). Although not shown, additional inputs may be received. For example, after enabling cyclic prefix, another indication of the level of ISI within the channel may be received. Subsequently, a determination may be made that the level of ISI within the channel is below the predetermined threshold level of ISI. Upon determining that ISI within the channel is below the predetermined threshold level, cyclic prefix may be disabled. In this way, cyclic prefix may be enabled and/or disabled for all channels within a cell, for channels leading to particular geographic locations, or for fewer than all channels within a cell and/or carried by a particular base station.

Figure 5:
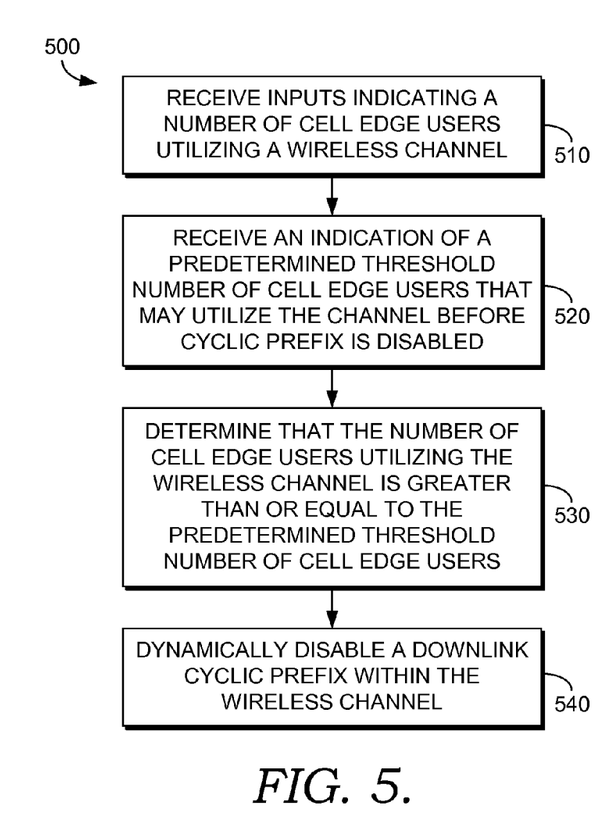
FIG. 5 depicts a flow diagram illustrating a method for dynamically disabling cyclic prefix within a wireless channel based on a number of cell edge users communicating with a base station via the wireless channel according to embodiments of the present invention.

Turning now to FIG. 5 depicts a flow diagram illustrating a method for disabling cyclic prefix (i.e., introducing linear convolution within a channel) when a number of cell edge users communicating via a channel exceeds a predetermined threshold number of cell edge users for the channel. The predetermined threshold number is a number at or above which user throughputs for a given user (e.g., cell edge users) decrease to below minimally-acceptable standards. The predetermined threshold number may be determined by a service provider or a network, such as network 204 of FIG. 2.

Initially, at a step 510, one or more inputs indicating a number of cell edge users communicating via the channel is received. The inputs may be gleaned from CQI reports generated by and communicated from mobile communication devices associated with each of the cell edge users. At a step 520, one or more inputs indicating a predetermined threshold number of cell edge users that may utilize the channel is received.

At a step 530, it is determined that the number of cell edge users utilizing the channel is at or above the threshold number of cell edge users that may utilize the channel before the cell edge users experience less than minimally-acceptable user throughputs. Upon making such a determination, at a step 540, cyclic prefix is disabled to provide additional bandwidth and power to the cell edge users. In some embodiments, cyclic prefix is only disabled when ISI within the channel is below a predetermined threshold level of ISI for the channel, as described above. Although not shown, the method depicted in FIG. 5 applies equally for roaming users as it does for cell edge users.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. Non-transitory computer storage media having computer-executable instructions embodied thereon that, when executed, enable a computing device to perform a method for dynamically enabling cyclic prefix based on increased distortion levels within a channel, the method comprising:
- receiving one or more inputs indicating a level of intersymbol interference (ISI) within one or more channels;
- receiving an indication of a predetermined threshold level of ISI for the one or more channels;
- determining that the level of ISI within at least one channel of the one or more channels is greater than or equal to the predetermined threshold level; and
- upon determining that the level of ISI within the at least one channel is greater than or equal to the predetermined threshold level, dynamically enabling a downlink cyclic prefix within the at least one channel;
- determining, when the downlink cyclic prefix is enabled, that the level of ISI within the at least one channel is less than the predetermined threshold level; and
- upon determining that the level of ISI within the at least one channel is less than the predetermined threshold level, dynamically disabling the downlink cyclic prefix within the at least one channel, such that no downlink cyclic prefix is enabled within the channel.

2. The media of claim 1, wherein dynamically disabling the downlink cyclic prefix removes all downlink cyclic prefix within the at least one channel such that an available bandwidth for the at least one channel is increased.

3. The media of claim 2, wherein enabling the downlink cyclic prefix decreases user throughputs, and wherein disabling the downlink cyclic prefix increases user throughputs.

4. The media of claim 1, further comprising:
- determining that a first channel of the one or more channels is associated with a level of ISI that is above the predetermined threshold level of ISI, wherein the first channel is a signal transmission medium for a first group of mobile communication devices;
- determining that a second channel of the one or more channels is associated with a level of ISI that is below the predetermined threshold level of ISI, wherein the second channel is a signal transmission medium for a second group of mobile communication devices;
- enabling a downlink cyclic prefix within the first channel; and
- disabling the downlink cyclic prefix within the second channel.

5. The media of claim 4, wherein the first group of mobile communication devices is associated with a first geographic location and the second group of mobile communication devices is associated with a second geographic location, and wherein the first geographic location is different than the second geographic location.

6. The media of claim 1, wherein the at least one channel is a long-term evolution channel.

7. The media of claim 1, wherein the downlink cyclic prefix is one of either a normal cyclic prefix having a length of 4.7 microseconds or an extended cyclic prefix having a length of 16.6 microseconds.

8. The media of claim 1, wherein enabling the downlink cyclic prefix introduces circular convolution within the at least one channel.

9. The media of claim 1, wherein at least one input of the one or more inputs is received from a mobile communication device.

10. The media of claim 9, wherein the at least one input includes a channel quality indication report generated by the mobile communication device.

11. The media of claim 1, wherein the downlink cyclic prefix is comprised of orthogonal frequency-division multiplexing symbols.

12. Non-transitory computer storage media having computer-executable instructions embodied thereon that, when executed, enable a computing device to perform a method of dynamically disabling cyclic prefix based on a number of cell edge users communicating via a channel, the method comprising:
- receiving one or more inputs indicating the number of cell edge users communicating via the channel;
- receiving an indication of a predetermined threshold number of cell edge users that may communicate via the channel before cyclic prefix is disabled;
- determining that the number of cell edge users communicating via the channel is greater than or equal to the predetermined threshold number of cell edge users; and
- upon determining that the number of cell edge users communicating via the channel is greater than or equal to the predetermined threshold number of cell edge users, dynamically disabling a downlink cyclic prefix within the channel, such that no downlink cyclic prefix is enabled within the channel.

13. The media of claim 12, further comprising:
- receiving one or more inputs indicating a level of intersymbol interference (ISI) within the channel;
- receiving an indication of a predetermined threshold level of ISI for the channel;
- determining that the ISI within the channel is above the predetermined threshold level; and
- upon determining that the ISI within the channel is above the predetermined threshold level, dynamically enabling the downlink cyclic prefix.

14. A transmitter apparatus for dynamically disabling or enabling a downlink cyclic prefix based on distortion levels within a channel, the apparatus comprising:
- a receiving component for receiving one or more inputs indicating a level of intersymbol interference (ISI) within the channel and for receiving an indication of a predetermined threshold level of ISI for the channel;
- a determining component for determining that the level of ISI within the channel is at one of a level below, a same level, or a level above the predetermined threshold level; and
- an adaptive convolution component for enabling or disabling the downlink cyclic prefix, wherein the downlink cyclic prefix is enabled when the level of ISI within the channel is at one of either the same level or the level above the predetermined threshold level, and wherein the downlink cyclic prefix is disabled when the level of ISI within the network is at the level below the predetermined threshold level, such that no downlink cyclic prefix is enabled within the channel.

15. The transmitter apparatus of claim 14, wherein the receiving component receives an indication of a number of cell edge users communicating via the channel.

16. The transmitter apparatus of claim 15, wherein the receiving component receives an indication of a predetermined threshold number of cell edge users that may communicate via the channel before cyclic prefix is enabled.

17. The transmitter apparatus of claim 16, wherein the determining component determines that the number of cell edge users communicating via the channel is above the predetermined threshold number of cell edge users that may communicate via the channel before cyclic prefix is disabled.

18. The transmitter apparatus of claim 17, wherein the adaptive convolution component is configured to disable the downlink cyclic prefix within the channel when the determining component determines that the number of cell edge users communicating via the channel is above the predetermined threshold number of cell edge users that may communicate via the channel before cyclic prefix is disabled.

19. The transmitter apparatus of claim 14, wherein the receiving component receives the indication of a predetermined threshold level of ISI from a service provider.

20. The transmitter apparatus of claim 14, wherein the transmitter apparatus comprises an evolved Node B.

\* \* \* \* \*